Oct. 25, 1966    F. HACH, JR., ETAL    3,280,881
TORCH WITH AN ELECTRIC IGNITER
Filed Jan. 4, 1966    2 Sheets-Sheet 1

*INVENTORS*
FRANK HACH JR.
ALFRED E. BURNELL
BY
*Tilberry & Body*
ATTORNEY

Oct. 25, 1966 F. HACH, JR., ETAL 3,280,881
TORCH WITH AN ELECTRIC IGNITER
Filed Jan. 4, 1966 2 Sheets-Sheet 2
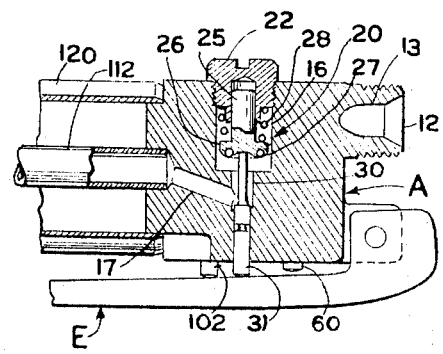
FIG. 5
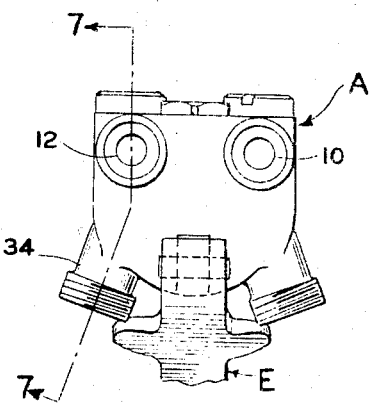
FIG. 6
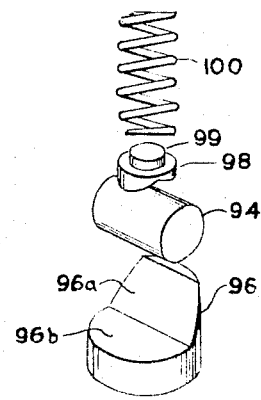
FIG. 8
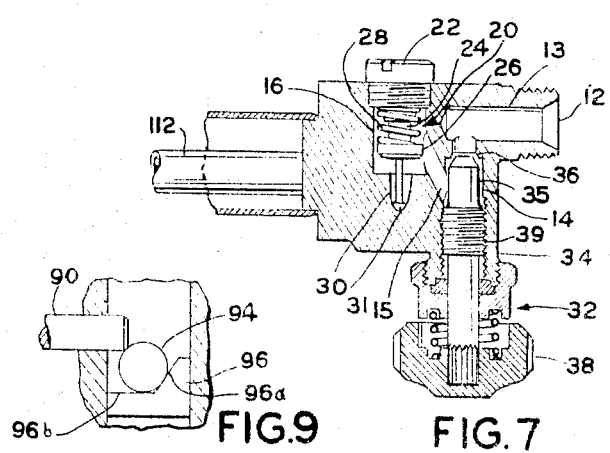
FIG. 9  FIG. 7
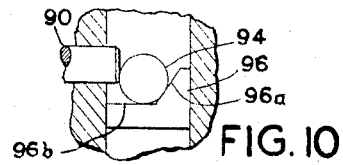
FIG. 10
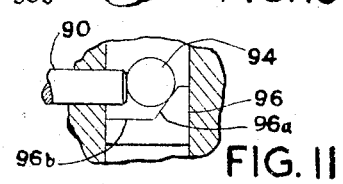
FIG. 11
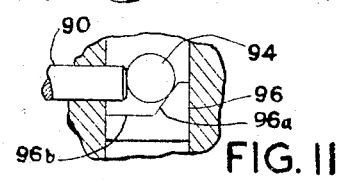
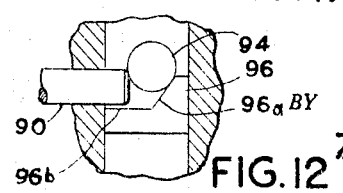
FIG. 12
*INVENTORS*
FRANK HACH JR.
ALFRED E. BURNELL
BY
*Tilberry & Body*
ATTORNEY

United States Patent Office 3,280,881
Patented Oct. 25, 1966

3,280,881
TORCH WITH AN ELECTRIC IGNITER
Frank Hach, Jr., Euclid, and Alfred E. Burnell, Rocky River, Ohio, assignors to The Harris Calorific Company, Cleveland, Ohio, a corporation of Ohio
Filed Jan. 4, 1966, Ser. No. 530,749
17 Claims. (Cl. 158—27.4)

This application is a continuation-in-part application of our copending application Serial No. 380,144, filed July 3, 1964, which was a continuation application of our application Serial No. 135,940, filed September 5, 1961, now abandoned.

This invention pertains to the art of gas burning torches and more particularly to a gas burning torch with an electric igniter.

The present invention is particularly applicable to a gas burning cutting torch, and it will be described with reference thereto; however, it will be appreciated that the invention has much broader applications and can be used in various gas burning torches, such as welding, soldering, heat treating and brazing torches.

Gas burning torches have as their essential components, a supply of a combustible mixture of gases, a nozzle or tip for directing the combustible mixture toward a workpiece which mixture is ignited to heat a workpiece, and valve members for controlling the flow of gases to the nozzle. Prior gas burning cutting torches were provided with a pair of valves, one for the fuel gas and the other for the oxygen, which valves had to be opened manually to permit flow of a combustible mixture of gases. This mixture was ignited, and then the valves were adjusted to produce a proper preheat flame. After the preheat flame heated the workpiece to a temperature that would support combustion, another valve was opened to furnish a supply of substantially pure oxygen to the heated area of the workpiece. The oxygen would burn or cut the workpiece along a path determined by movement of the torch. To decrease the amount of gases used during operation of the torch, it is desirable to turn off the preheat flame between cutting operations. However, because of the difficulty in igniting the preheat flame and readjusting the valves each time, an operator often left the preheat flame burning. This resulted in an increase in the cost of operating the torch because of the waste of the gases and presented a substantial fire hazard as the torch, with the preheat flame burning, was moved from one workpiece to another.

Many systems have been suggested for igniting a cutting torch so that the torch could be repeatedly ignited without substantial inconvenience to the operator. Many of these systems have included electric spark igniters with a spark gap adjacent the torch nozzle; however, these systems have been unsuccessful, and they are not now in general use. One type of system previously suggested comprised a battery mounted on the torch with a condenser discharge circuit. These systems were not successful because the battery was heavy and had a short life. The condenser discharge circuit produced only a single spark on each actuation. Consequently, if conditions were not such to cause combustion when the circuit created the single spark, the torch would not ignite. For this reason, this battery system was not appropriate for general industrial use. A second type of suggested electrical igniter included a transformer on the torch and connected by a cord onto an electrical outlet. This system was dangerous because the cord was easily shorted, and the torch could be used only in the immediate vicinity of an electrical outlet. Also, only a single spark was created with each actuation.

This invention relates to an electric igniter for a gas burning torch and an actuator for the igniter that overcomes the disadvantages mentioned above and others, and results in a compact, easily handled torch assembly.

In accordance with the present invention there is provided an improvement in a gas burning torch having a nozzle with an outlet, valve means for directing a combustible mixture through the outlet, and means forming a spark gap having a predetermined break down voltage and positioned in igniting relationship with the mixture flowing through the outlet. The improvement comprises a piezoelectric crystal electrically connected across the spark gap and having a maximum allowable change in dimensions with the crystal generating a voltage at least several times the break down voltage when the crystal is deformed to the maximum allowable diminsional change. There is also provided, in accordance with the invention, a mechanical actuator on the torch and movable in a first direction, a cam structure movable by the actuator, and a follower means for changing the dimensions of the crystal as the cam structure is moved. The cam structure and follower means are dimensioned to move the follower means toward the crystal to change the dimensions of the crystal a sufficient amount to create a voltage of at least three times the break down voltage of the spark gap as the actuator is moved a predetermined distance in the first direction so that a plurality of sparks are created across the spark gap. Finally, there is provided a means for opening the valve means prior to generation of at least a plurality of the sparks whereby the mixture is subjected to a plurality of sparks.

The primary object of this invention is to provide an inexpensive compact and easily maintained electric spark igniting device for a gas burning torch.

Still another object of this invention is to provide an electric igniting device for a gas burning torch which ignites the combustible mixture of gases coming from the torch over a wide range of ratios of the gases comprising the mixture.

Another object of the present invention is to provide a spark igniting device for a gas burning torch which requires no external power source and which has no mechanical switch in the electrical circuit.

Still a further object of this invention is to provide an electric igniting device for a gas burning torch which produces a high concentration of energy at the ignition point.

A further object of the present invention is to provide an electric igniting device for a gas burning torch which device produces a plurality of closely timed sparks at the nozzle or tip of the torch so that ignition of the torch requires a single actuation of the igniter.

Another object of the present invention is to provide an electric spark igniting device having an actuator which first opens the valve controlling the flow of a combustible mixture of gases and then causes an electric spark that ignites the mixture.

Still another object of this invention is to provide a single, two stage actuator means for a gas burning torch which opens the valve controlling the flow of a combustible mixture of gases and subsequently ignites the mixture during the first stage and then opens a valve controlling the flow of oxygen during the second stage.

Another object of the present invention is to provide a gas burning torch having a spark igniting device powered by a self-contained source of electrical energy which does not deteriorate with usage and will produce essentially the same sparking energy regardless of temperature or humidity.

Another object of this invention is to provide a gas burning torch having an electric spark igniting device which torch is safe to operate and saves gas.

A still further object of this invention is to provide a gas burning torch with a piezoelectric igniting device.

These and other objects and advantages will become apparent from the following description used to illustrate the preferred embodiment of the invention as read in connection with the accompanying drawings in which:

FIGURE 5 is a cross sectional view along line 5—5 of FIGURE 2;

FIGURE 6 is an end view of the torch;

FIGURE 7 is a cross sectional view along line 7—7 of FIGURE 6;

FIGURE 8 is an exploded view of a preferred embodiment of the actuating means for the igniting device; and, FIGURES 9–12 are progressive views showing the operation of the actuating means illustrated in FIGURE 8.

Figure 1:
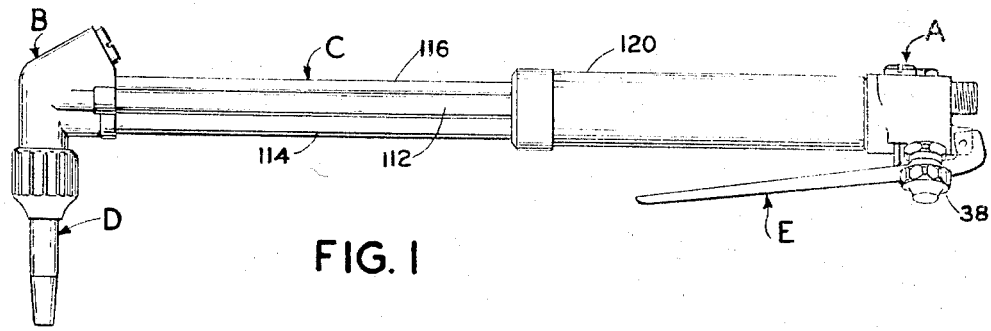
FIGURE 1 is a side view of a gas burning torch provided with a preferred embodiment of the present invention.

Referring now to the drawings, wherein the showings are for the purpose of illustrating a preferred embodiment of the invention and not for limiting same, FIGURE 1 shows a gas burning torch comprised of a valve housing A; a torch head B connected to the valve housing by a plurality of connecting tubes C; a torch nozzle D and an actuator E which in the present embodiment takes the form of a manually operated lever pivotally mounted on the valve housing A. In this embodiment, the gas burning torch is used in cutting metal workpieces and has a preheat cycle wherein actuator E is depressed to cause a combustible mixture to flow from nozzle D which mixture is ignited to form a preheat flame which is used to heat the workpiece to a temperature that will support combustion, and a cutting cycle wherein the actuator E is further depressed to cause an oxidizing fluid to flow from nozzle D to cut the heated workpiece.

Figure 2:
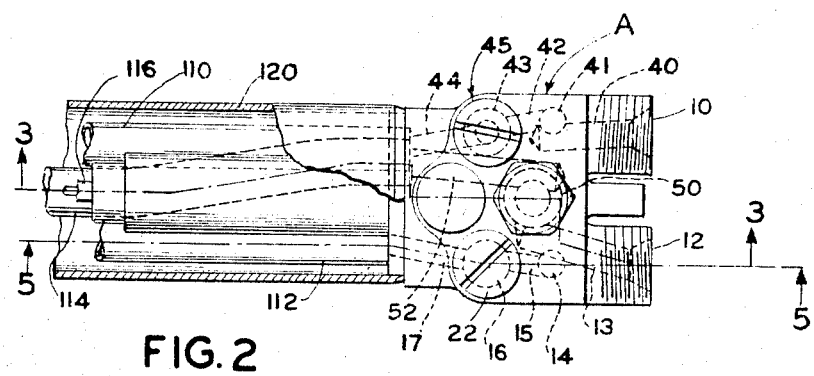
FIGURE 2 is a partial top view illustrating a preferred embodiment of the present invention.

In FIGURE 2, the valve housing A is provided with an inlet 10 connected to a source of fuel, such as natural gas, propane, acetylene, etc., hereafter referred to as gas, and an inlet 12 which is connected to a source of oxidizing fluid, such as oxygen, hereafter referred to as oxygen. The flow of both the gas and the oxygen through the valve housing may be accomplished by a number of passage arrangements; however, it has been found that the passages as disclosed in the preferred embodiment are easily machined and require minimum dimensions of the valve housing A. The particular passages as disclosed do not form a part of the present invention; however, they provide for the flow of gas and oxygen through the valve housing in a manner that accommodates the present invention.

Referring particularly to the path of the oxygen through the valve housing A, the inlet 12 communicates with a generally, longitudinally extending passage 13 which is intersected by an intermediate, vertical passage 14 that directs oxygen from the passage 13 to another generally, longitudinally extending passage 15. Passage 15 directs the oxygen into a valve chamber 16, from which chamber the oxygen passes through an outlet 17 under the control of a valve 20 which is disclosed in FIGURES 5–7. This valve controls the flow of oxygen during the preheat cycle of the cutting torch. The valve 20 is comprised of a cap 22 threadedly received in the upper portion of chamber 16 to support the valve elements in operating position within the chamber. Reciprocably mounted within chamber 16 is a valve body 24 having an upwardly extending shank 25 reciprocably received within a lower bore of cap 22 and a valve head 26 which has a lower surface for receiving a sealing ring 27. The valve body 24 is biased downwardly by a compression spring 28 concentrically mounted with respect to shank 25. The lower portion of the valve chamber 16 is provided with a vertical passage 20 which terminates in a bore that receives a reciprocating plunger 31 extending from the valve housing A and engageable with the actuator E. The plunger is sealed by appropriate means, such as an O-ring seal. Although valve 20 has been described in detail, a variety of structural modifications may be made without departing from the operation of the valve which in essence forms a normally closed valve between passage 15 and outlet passage 17.

During the preheat cycle of the torch, the proportion of oxygen and gas which is directed from the valve housing to the torch nozzle must be controlled to assure a combustible and economical mixture at the nozzle; therefore, an adjusting valve is usually interposed in the preheat oxygen path of the valve housing. Of course, the adjusting valve may be located at any position in the preheat oxygen path; however, in the preferred embodiment it is mounted directly onto the valve housing A. The adjusting valve 32 is affixed to a threaded boss 34 extending from the valve housing, and is comprised of a needle valve 35 coacting with a conical shoulder 36 within passage 14, an actuating knob 38 and a shank portion 39 threadedly received within the valve housing so the setting of the needle valve 35 is changed on rotation of knob 38.

Referring again to FIGURE 2, the gas inlet 10 termiates in a generally longitudinally extending passage 40 which directs the gas through an intermediate, vertical passage 41 to another longitudinally, extending passage 42. From the longitudinally extending passage 42 the gas is directed through a valve chamber 43 to an outlet passage 44. The valve chamber 43 is adapted to house a gas valve 45 identical to the oxygen valve 20 in valve chamber 16; therefore, detailed disclosure of the gas valve is not necessary. The reciprocating plunger 46 shown in FIGURE 3 operates valve 45 and corresponds to plunger 31 of valve 20. The intermediate chamber 41 of the gas path through the valve housing is provided with an adjusting valve identical to adjusting valve 32 of the preheat oxygen path. The two adjusting valves are coordinated to provide the proper combustible mixture for the pre-heat cycle of the torch.

Figure 3:
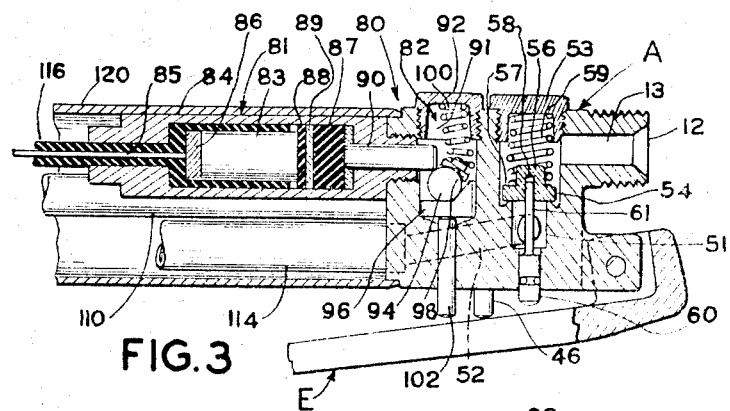
FIGURE 3 is a cross sectional view along line 3—3 of FIGURE 2.

Referring to FIGURES 2 and 3, the longitudinally extending oxygen passage 13, not only leads to intermediate passage 14, but also to an additional valve chamber 50 which communicates with a vertical passage 51 to direct oxygen from passage 13 to outlet passage 52. The valve chamber 50 is closed by a cap 53 and is provided with a reciprocal valve body 54 having a spring guide shank 56, a valve head 57 and a lower bore 58. The valve body is biased downwardly by spring 59 to seal chamber 50 from passage 51. A plunger 60 has an upwardly extending shank 61 slidably received within bore 58 of the valve body 54. Upward movement of plunger 60 moves valve body 54 to open the valve chamber to provide free flow of oxygen from passage 13 to outlet 52.

To ignite the combustible mixture of gas and oxygen flowing from the torch nozzle during the preheat cycle, the torch is provided with an igniting device which is comprised of a spark gap adjacent the nozzle (not shown), a piezoelectric crystal and a means for causing the crystal to generate a sparking voltage across the spark gap. The spark gap is constructed with a predetermined spacing so that the gap will have a given break down voltage. In order to create a spark across the gap, a voltage exceeding the break down voltage must be applied across the gap. When a high voltage appears across the gap, a spark is created, and the voltage drops to a lower level which causes an extinguishment of the spark. For this reason, prior spark igniting devices were unsuccessful. Only a momentary voltage pulse was impressed across the gap, and only a single spark was created. If the preheat gas was not flowing past the spark gap or if the one spark, for other reasons, did not cause combustion, the torch was not ignited without repeated cycling of the spark actuator.

The single spark concept is inherent in all igniters using capacitor discharge because the time constant of the low resistance circuit created by the spark across the gap was quite low, and the capacitor was discharged immediately. Prior capacitor discharge spark igniters not only produced a single spark, but also the spark had low intensity. These prior devices function by storing energy within a condenser. Since a condenser has inherent leakage when mounted in a device such as a torch, the voltage would drain from the condenser prior to discharge across the gap. This lowered the useable voltage at the spark gap. In addition these prior ignited devices generally included a switch which caused a power loss when actuated. All of these difficulties are overcome by the present invention which produces a voltage over three times the break down voltage of the spark gap and which does not require a switch or mechanical means for discharging the voltage across the gap.

Figure 4:
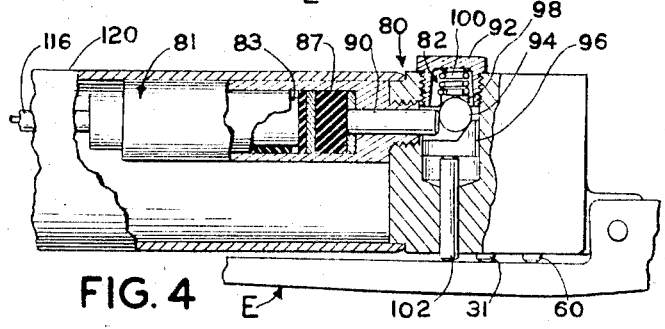
FIGURE 4 is a partial cross sectional view similar to FIGURE 3.

A variety of structural embodiments of this igniting device could be used, however, in the preferred embodiment disclosed in FIGURES 3 and 4, the igniting device takes the form of a piezoelectric cylinder 81 and a cam firing mechanism 82. Referring with more particularity to the piezoelectric cylinder 81, a piezoelectric crystal 83 is threadedly supported on valve housing A by a casing 84 having a forwardly extending conductor, or wire, 85 which leads to the spark gap located within the torch nozzle D which is disclosed in detail in our copending application S.N. 218,915, filed August 23, 1962, now abandoned. The wire 85 is attached to a contact base 86 which bears against the lower surface of the crystal 83 which is electrically insulated from the casing 84. To apply uniform pressure onto the upper surface of crystal 83, the cylinder 81 is provided with a pressure pad 87 which may take various forms; but in the preferred embodiment, is a rubber slug, and the pad bears against an insulation disc 88 and a pressure disc 89. To exert a compressive stress on the crystal 83 a plunger 90 extends through casing 84 and abuts against pressure pad 87. Movement of the plunger into the casing causes a multiplied force on the crystal 83 because of the area differential between the upper surface of the crystal and the end surface of the plunger.

The cam firing mechanism 82 as disclosed in the preferred embodiment is comprised of a chamber 91 in the valve housing A into which chamber the end of plunger 90 extends transversely so inward reciprocal movement of the plunger axially stresses the crystal 83. The chamber 91 is closed by threaded cap 92 and houses the cam arrangement of the firing mechanism 82. This cam arrangement is comprised of a roller or similar intermediate cam element 94, a reciprocal cam block 96, a pressure block 98 having a spring support 99, a coil spring 100 and a plunger 102 which extends outwardly from the valve housing A (see FIGURE 8). Although the actual shape of the cam block 96 may vary, in the preferred embodiment, the block is provided with an inclined cam surface 96a facing generally toward the plunger 90 and a bottom surface 96b which supports roller 94 and is adapted to force the roller upwardly as the block is moved upwardly by plunger 102.

In essence the mechanism 82 changes the stress within crystal 83 at a rate sufficient to create a sparking potential across the spark gap adjacent the outlet of the torch nozzle. This change of stress can be accomplished by compressing, stretching, bending or twisting the crystal. In the preferred embodiment of the invention crystal 83 is stressed by applying a compressive force on the crystal and then releasing the force to allow the crystal to restore itself to its original shape and stress condition.

The connecting tubes indicated as portion C of the torch illustrated in FIGURE 1, are used to direct the gas, oxygen and electrical sparking current from the valve housing A, to the torch head B. The inner construction of head B is not an important aspect of the present invention and it is not shown in detail. However, this head is disclosed in detail in our copending application S.N. 218,915, filed August 23, 1962. Referring to these connecting tubes in more detail, tube 110 is connected to outlet passage 44 and directs gas from the valve housing A to the torch head B; tube 112 is connected to outlet 17 and directs preheat oxygen to the torch head B; tube 114 is connected to outlet passage 52 and directs cutting oxygen to the torch head B and tube 116 extends from head B to carry the wire 85 which directs the sparking current from the crystal 83 to the spark gap located within nozzle D. These tubes serve the ancillary purpose of supporting the torch head B with respect to the valve housing A since in the preferred embodiment they are produced of lengths of tubular metal. To protect the piezoelectric cylinder 81 a portion of the connecting tubes are covered by a slidable shield 120 which may be moved toward the torch head B to allow access to the piezoelectric cylinder.

Referring to the operation of the igniting device 80 comprised basically of the piezoelectric cylinder 81 and the cam firing mechanism 82 operated by the outwardly extending plunger 102, upward movement of the plunger by actuator E stresses the crystal 83 to generate a sparking voltage at least three times the break down voltage of the gap which voltage causes a current to flow through wire 85 to the spark gap located within the torch nozzle. The crystal 83 will generate a voltage when a force is applied to and stresses the crystal, or when an applied force is released from the crystal; and the effective magnitude of the voltage generated by the crystal corresponds to the rate of application or release of the force. Therefore, a voltage is generated by the crystal 83 on inward and outward movement of plunger 90 and the usable magnitude of the voltage will correspond to the speed at which the plunger is operated. In the absence of leakage, the voltage from the stressed crystal is proportional to the force applied to the crystal even though slowly applied. If the crystal is compressed to produce a positive voltage, this voltage will return to zero when decompression occurs. But if, when compressed, the voltage is removed or dissipated by momentary shorting or discharge at the spark gap, decompression will produce a negative voltage, or at least, a voltage of opposite polarity to the voltage caused by compression. The crystal generates a voltage as its dimensions are changed, and the crystal has a maximum allowable distortion or compression. Actuator E is constructed so that the crystal is not stressed beyond this maximum.

In the preferred embodiment of the igniting device disclosed in FIGURES 2 and 3, the plunger 90 is moved inwardly at a relatively low velocity which causes crystal 83 to generate a voltage that may or may not cause a spark within the nozzle. In practice, a plurality of sparks are created across the gap as the crystal is compressed. The plunger is, thereafter, moved outwardly at a high velocity to abruptly release the force from the crystal 83 to cause the crystal to generate a sparking voltage which will cause a final, high energy spark within the nozzle. Since the sparking voltage is generated by the crystal on release of a stressing force there is a time delay between initial actuation of the crystal and the generation of the final sparking voltage.

This operation may be accomplished by a variety of structural modifications; however, in the preferred embodiment on initial inward movement of plunger 102 the roller 94 is moved upwardly by cam block 96 to wedge the roller between plunger 90, bottom surface 96b and inclined cam surface 96a (see FIGURE 9). Further upward movement of the plunger 102 forces roller 94 upwardly and by a wedging action, the roller 94 exerts an axial force on plunger 90 which moves plunger 90 inwardly against the crystal 83 (see FIGURE 10). The inward movement of the plunger 90 is determined by the speed of movement of plunger 102; however, the plunger speeds are not directly proportional since the upward displacement of roller 94 causes a substantially lesser inward displacement of plunger 90 which rides over only a small arcuate portion of the external cylindrical surface of roller 94. With the plunger 90 and roller 94 in the position disclosed in FIGURE 10, force is applied to the crystal 83 by roller 94. When the reactive force of pressure pad 87 is exerted above the center of roller 94, as in FIGURES 9 and 10, a downward component of force holds the roller against bottom surface 96b and plunger 90 cannot move away from the crystal; however, as the force exerted by pressure pad 87 passes through the center of roller 94 by further upward movement of plunger 102, the downward component of force is eliminated and the roller is supported by only the cam surface 96a (see FIGURE 11). Since the cam surface 96a is inclined, the force of the pressure pad 87 abruptly moves the roller along the cam surface to allow rapid outward movement of plunger 90 (see FIGURE 12). This rapid outward movement of the plunger 90 abruptly releases the pressure on crystal 83 to generate a sparking voltage within the crystal which voltage causes a sparking current to pass through wire 85. Further upward movement of plunger 102 has no effect on plunger 90 since the force transmitting roller 94 is no longer wedged between plunger 90 and cam surface 96a. As plunger 102 is released and moved in a downward direction, the cam block 96 is forced downwardly by spring 100 which forces roller 94 back into engagement with bottom surface 96b below the inwardly extending end of plunger 90. During the downward further movement of roller 94, no force is exerted on the plunger 90 since the roller is not wedged between the plunger and surface 96a. This relieves pressure from the actuator.

The operation of the gas burning torch is accomplished through an actuator means disclosed in the preferred embodiment as a manually actuated handle E pivotally affixed on valve housing A, which handle coacts with plungers 31, 46, 60 and 102 to cause flow of a combustible mixture, to ignite that mixture and to cause flow of cutting oxygen in proper sequence. The sequence of actuating the various plungers is determined by the distance the plungers extend from the valve housing and the portion of the actuator which they contact. The actuator E is characterized by having two separate and distinct operating stages which are determined by the angular position of the actuator. During the first stage, the actuator E is pivoted to open oxygen valve 20 and gas valve 45 by inward movement of plungers 31 and 46 to direct a combustible mixture through nozzle D. As the actuator is pivoted to open these valves, plunger 102 is also moved inwardly to apply a stressing force on the crystal 83 which force is released to generate a sparking voltage that ignites the combustible mixture as it passes out the nozzle. An important aspect of this first stage results from the time delay between initial activation of crystal 83 and generation of a final sparking voltage which causes a final spark in the nozzle after the valves 20 and 45 have been opened a sufficient time to allow the combustible mixture to pass from the valve housing A to the spark gap in the nozzle. This delayed action of the cam firing mechanism has been discussed in detail above wherein it was mentioned that during initial movement of the plunger 102, a gradual pressure is applied to the crystal and this pressure is thereafter abruptly released on further movement of the plunger 102. By this construction, the actuator E operates the combustible mixture valves and fires the piezoelectric crystal 83 repeatedly on a single movement to initiate positively the preheat cycle of the torch. It is realized that this crystal actuation means may have more and broader applications.

In many installations the gas burning torch will have only the first operating stage, and a separate valve for the cutting oxygen which is required in a cutting torch will not be necessary. However, in the preferred embodiment, the plunger 60 opens a cutting oxygen valve 54 after the preheat cycle has heated the workpiece. The second operating stage of actuator E opens this oxygen valve and is accomplished by further depression of the actuator which moves plungers 31, 46 and 102 further into the valve housing A and shifts plunger 60 inwardly to open the oxygen valve. Further movement of the plungers 31, 46 and 102 has no effect on the mechanisms which these plungers control because valves 20 and 45 are fully open during the first operating stage of actuator E and further upward movement of plunger 102 shifts roller 94 further along the plunger 90 without exerting an axial force on that plunger. To illustrate the angular position of actuator E and the position of the various plungers during the two operating stages, FIGURE 3 shows the actuator E prior to the first stage of movement of the actuator; FIGURE 5 shows the position of actuator E after the second stage of movement of the actuator wherein all plungers are depressed.

In accordance with the invention as discussed above, the actuator or handle E is movable from a first, or "off," position with all valves closed, to a second, or "preheat," position with two preheat valves open, and to a third, or "cutting," position with the cutting oxygen valve open. The igniting device includes a cam structure for moving cam follower or plunger 90 with respect to crystal 83. This cam structure may take a variety of forms; however, the follower or plunger 90 is forced toward the crystal 83 to stress the same when handle E is pivoted in a first direction toward the torch body, and the follower is allowed to move away from the crystal while the handle continues movement in the first direction. By properly contouring or constructing the cam actuating arrangement, the crystal is not stressed beyond its maximum allowable dimensional change. In addition, the cam is constructed so that the crystal is deformed by plunger 90 as the handle moves beyond the second position and the intended amount of deformation is sufficient to produce a voltage at least three times the break down voltage of the spark gap. In this way, a plurality of sparks are created across the gap. After one spark occurs, the voltage drops; however, the crystal continues to be stressed by the cam. Thus, another spark is created. This operation is repeated so that a plurality of sparks are created while the plunger 90 moves toward the crystal. As the cam structure approaches the third position the crystal is released suddenly to create a final high intensity spark which will ignite the preheat mixture if necessary. This assures ignition of preheat gas flowing from the torch. Prior electrical igniting devices used capacitors which were discharged and produced but a single spark which often did not ignite the combustible mixture flowing from the torch.

The cam actuating mechanism discontinues stressing of the crystal between the second and third positions of handle E so that the crystals may restore itself to the substantially unstressed position. This produces an additional spark or sparks across the gap to assure ignition of the preheat flame as mentioned above. By allowing the follower or plunger 90 to move away from the crystal before handle E reaches the third position or "cutting" position, reaction force is removed from the handle during the cutting operation. This relieves the operating force during the major time which the torch is being handled.

A variety of structural changes may be made in the preferred embodiment disclosed in the drawings without departing from the spirit and scope of the invention as defined in the appended claims.

What is claimed is:

1. In a gas burning torch having a nozzle with an outlet, the improvement comprising: means forming a spark gap adjacent the outlet, a piezoelectric crystal and an actuator means for causing the crystal to generate a sparking voltage across said gap, said actuator means comprising a plunger extending toward said piezoelectric crystal, first means to apply a gradually increasing pressure on said crystal by moving said plunger toward said crystal and during which at least a part of the voltage is dissipated and a second means for abruptly releasing said pressure from said crystal to produce a sparking voltage.

2. In a gas burning torch having a nozzle with an outlet, the improvement comprising: means forming a spark gap adjacent said outlet, a piezoelectric crystal, and an actuator means for causing the crystal to generate a sparking voltage across said gap, said actuator means comprising a plunger extending toward said piezoelectric crystal, said plunger reciprocally mounted on an axis, a pressure means between said crystal and said plunger, a first cam means movable perpendicularly with respect to said axis for gradually moving said plunger toward said crystal and against said pressure means and during which at least a part of the voltage is dissipated, and means for abruptly releasing said plunger whereby said pressure means rapidly moves said plunger away from said crystal to produce a sparking voltage.

3. In a gas burning torch having a nozzle with an outlet, the improvement comprising: means forming a spark gap adjacent the outlet, a piezoelectric crystal, and an actuator means for causing the crystal to generate a sparking voltage across said gap, said actuator means comprising a plunger extending toward said piezoelectric crystal, said plunger reciprocally mounted on an axis, a pressure transmitting means between said crystal and said plunger, a cam block movable along a path perpendicular to said axis and having a bottom surface and an inclined cam surface, each surface facing said plunger, an intermediate cam member, said cam member contacting said bottom surface and said cam surface during initial movement of said cam block toward said plunger to force said plunger toward said crystal, further movement of said cam block toward said plunger shifting said cam block along said cam surface away from said bottom surface to allow said pressure means to force said plunger away from said crystal.

4. The improvement as defined in claim 3 wherein said intermediate cam member comprises a roller member having an axis perpendicular to both the axis of said plunger and the path of movement of said cam block.

5. In a gaseous fuel burning torch having a nozzle with an outlet, a valve for directing said fuel out said outlet, and a pivotally mounted lever for opening said valve, the improvement comprising: means forming a spark gap adjacent said nozzle outlet, a piezoelectric crystal, an actuator means for causing the crystal to generate a sparking voltage across said gap, said actuator means including a plunger slidably mounted for stressing said crystal when moved in one direction and for releasing said stress on said crystal when moving in the opposite direction, mechanical means for operably associating said plunger with said valve actuator handle, said mechanical means including an over-center device operably associated with said plunger, said over-center device having a means for first moving said plunger in said one direction as said handle is pivoted toward said torch and during which at least a part of the voltage is dissipated and then allowing said plunger to snap in said opposite direction to thereby produce a sparking voltage after said handle has been pivoted a predetermined extent toward said torch.

6. A gas burning torch comprising a nozzle with an outlet for a combustible gaseous mixture, a valve for selectively directing said gaseous mixture through said outlet, a spark gap adjacent said outlet, a piezoelectric crystal connected in electrical series with said spark gap and means including a mechanical actuator for stressing said crystal at a sufficient rate to generate a sparking voltage across said spark gap, said actuator including a member moveable toward said crystal to apply a stress creating a compressive force on said crystal and means for forcefully moving said member gradually toward said crystal to cause compressive stress in said crystal and during which at least a part of the voltage is dissipated and then allowing said crystal to restore itself suddenly to its original unstressed condition to produce a sparking voltage.

7. A gas burning torch comprising a nozzle with an outlet for a combustible gaseous mixture, a valve for selectively directing said gaseous mixture through said outlet, a spark gap adjacent said outlet, a piezoelectric crystal connected in electrical series with said spark gap and a mechanical actuator for stressing said crystal at a sufficient rate to generate a sparking voltage across spark gap, said actuator including a member movable toward said crystal to apply a stress creating compressive force on said crystal and means for gradually moving said member toward said crystal and during which at least a part of the voltage is dissipated and then abruptly removing the force from said member to allow said crystal to restore itself to its original unstressed condition to produce a sparking voltage.

8. A gas burning torch comprising a nozzle with an outlet for a combustible gaseous mixture, a valve for selectively directing said gaseous mixture through said outlet, a spark gap adjacent said outlet, a piezoelectric crystal connected in electrical series with said spark gap and a mechanical actuator for stressing said crystal at a sufficient rate to generate a sparking voltage across said spark gap, said actuator including a cam follower operatively associated with said crystal so as to change the stress in said crystal when moved in a least one direction, a member spaced from said crystal and forceably movable in a given direction and cam means between said follower and said member to first move said cam follower in one direction as said member is moving in said given direction and then release said cam follower to move in another direction as said member continues to move in said given direction.

9. A gas burning torch comprising a nozzle with an outlet for a combustible gaseous mixture, a valve for selectively directing said gaseous mixture through said outlet, a spark gap adjacent said outlet, a piezoelectric crystal connected in electrical series with said spark gap and a mechanical actuator for stressing said crystal at a sufficient rate to generate a sparking voltage across said spark gap, said actuator including a cam follower operatively associated with said crystal so as to change the stress in said crystal when moved and a cam mechanism having a member for contacting said follower, movement of said cam mechanism in a single direction causing said member to first forcibly move said cam follower in one direction and during which at least a part of the voltage is dissipated and then release said cam follower whereby said crystal is stressed sufficiently to generate a sparking voltage across said gap.

10. A gas burning cutting torch comprising a nozzle with an outlet for a combustible gaseous mixture of fuel and substantially pure oxygen, a valve for selectively directing said gaseous mixture through said outlet, a spark gap adjacent said outlet, a piezoelectric crystal connected in electrical series with said spark gap, an external operating member for opening and closing said valve, and a mechanical actuator for stressing said crystal whereby upon release of stress on said crystal a sufficient voltage is caused to create a spark across the spark gap, said actuator including a member movable toward and away from said crystal to exert a compressive force on said crystal and during which movement toward and movement away from said crystal by said member, voltage from the crystal is dissipated, with at least the voltage dissipation on movement away from the crystal resulting in a spark across said spark gap, and means controlled by movement of said external member in a single direction for forcibly driving said member toward said crystal at a controlled speed substantially less than the speed of said member as it moves away from said crystal.

11. A spark ignited cutting torch comprising: a valve body adapted to be connected to a source of oxygen gas and a fuel gas and having a first pair of valve members and a second valve member, said valve members being movable between a closed and an open position; a tip having an outlet through which gases from said valve flow when said valve members are moved into the open position; said first valve members controlling flow of a combustible mixture of said oxygen gas and said fuel gas for preheating a workpiece; said second valve member controlling flow of said oxygen gas for cutting said workpiece; a handle mounted on said valve body and movable progressively from a first, to a second, to a third position; said handle being operably associated with said valve members so that all of said valve members are closed in said first position; only said valve members are open in said second position, and at least said second valve member is open in said third position; means forming a spark gap in said tip and having a predetermined break down voltage; a piezoelectric crystal mounted on said valve body and having terminals connected across said spark gap; said crystal having a predetermined maximum dimensional change under stress without being damaged and a known voltage output per unit change in dimension; a cam strucure movable by said handle and having a predetermined rise; a cam follower engageable by said cam structure and operatively associated with said crystal to cause a dimensional change in said crystal when said follower is moved by said cam structure; and said cam rise being contoured to change the dimension of said crystal less than said maximum when said handle is moved from said first to said third position and, when said handle is moved from said first position to a position intermediate said second and third positions, said cam rise causes a dimensional change in said crystal sufficient to produce a voltage at least three times that required to break down said spark gap whereby as said handle is moved from said first position and past said second position a plurality of sparks appear across said gap.

12. A spark ignited cutting torch as defined in claim 11 wherein said cam rise releases said follower for movement from said crystal after said handle moves beyond said intermediate position toward said third position whereby force exerted by said cam on said handle is substantially reduced.

13. A spark ignited cutting torch comprising: a valve body adapted to be connected to a source of oxygen gas and a fuel gas and having a first pair of valve members and a second valve member, said valve members including plungers extending from said body to move valve members between a closed and an open position; a tip having an outlet through which gases from said valve members flow when said valve members are moved into the open position; said first valve members controlling flow of a combustible mixture of said oxygen gas and said fuel gas for preheating a workpiece; said second valve member controlling flow of said oxygen gas for cutting said workpiece; a handle pivotally mounted on said valve body and moveable progressively in a first direction from a first, to a second, to a third position; said handle having a surface facing each of said plungers and generally perpendicular thereto; said plungers being arranged with respect to said handle so that all of said valve members are closed in said first position, only said first valve members are open in said second position, and at least said second valve member is open in said third position; means forming a spark gap in said tip and having a predetermined break down voltage; a piezoelectric crystal mounted on said body and having terminals connected across said spark gap; said crystal having a predetermined maximum dimensional change under stress without being damaged and a known voltage output per unit change in dimension; a cam structure movable by pivoting said handle and having a predetermined rise; a cam follower engageable by said cam structure and operatively associated with said crystal to cause a dimensional change in said crystal when said follower is moved toward and away from said crystal by said cam structure; said rise of said cam structure being operative to move said follower toward said crystal and then allowing said follower to move away from crystal as said handle is pivoted in said first direction; said cam structure rise being contoured so that said movement of said follower toward said crystal takes place at least after said handle has been pivoted in said first direction beyond said second position and said movement of said follower away from said crystal takes place before said handle has been pivoted in said first direction into said third position; the rise of said cam structure causing a dimensional change in said crystal when said follower moves toward said crystal which change in dimension is less than said maximum and sufficent to produce a voltage at least three times that required to break down said spark gap whereby as said handle pivots in said first direction a plurality of sparks appear across said spark gap after first valve members are opened.

14. In a gas burning torch having a nozzle with an outlet, valve means for directing a combustible mixture through said outlet, and means forming a spark gap adjacent said outlet and in igniting relationship with said mixture flowing through said outlet, said spark gap having a predetermined break down voltage, the improvement comprising: a piezoelectric crystal electrically connected across said spark gap and having a maximum allowable change in dimensions, said crystal generating a voltage at least several times the break down voltage when said crystal is deformed to said maximum allowable dimensional change, a mechanical actuator on said torch and movable in a first direction, a cam structure movable by said acutator, a follower means for changing the dimensions of said crystal as said cam structure is moved, said cam structure and follower means being dimensioned to move said follower means toward said crystal to change the dimensions of said crystal a sufficient amount to create a voltage of at least three times said break down voltage as said mechanical actuator is moved a predetermined distance in said first direction so that a plurality of sparks are created across said spark gap, and means for opening said valve means prior to generation of at least a plurality of said sparks whereby said mixture is subject to a plurality of said sparks.

15. The improvement as defined in claim 14 wherein said cam structure releases said follower for movement away from said crystal after said mechanical actuator is moved beyond said predetermined distance in said first direction whereby force is relieved from said follower means, said cam structure and said mechanical actuation.

16. The improvement as defined in claim 14 wherein said cam structure abruptly releases said follower from said crystal to create a high voltage across said gap and, thus, create a final high energy spark across said spark gap.

17. The improvement as defined in claim 14 wherein said mechanical actuator controls said valve opening means as said actuator is moved in said first direction.

References Cited by the Examiner
UNITED STATES PATENTS

| 2,888,066 | 5/1959 | Wilson | 158—27.4 |
| 3,082,333 | 3/1963 | Hufferd et al. | 310—8.3 |
| 3,106,080 | 10/1963 | Suits | 67—31 |

FREDERICK L. MATTESON, Jr., *Primary Examiner.*

E. G. FAVORS, *Assistant Examiner.*